(12) United States Patent
Kim et al.

(10) Patent No.: US 11,169,686 B2
(45) Date of Patent: Nov. 9, 2021

(54) ELECTRONIC DEVICE HAVING FLEXIBLE DISPLAY AND OPERATING METHOD THEREOF

(71) Applicant: Samsung Electronics Co., Ltd., Gyeonggi-do (KR)

(72) Inventors: Soo-Hyung Kim, Gyeonggi-do (KR); Byoung-Uk Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 16/258,835

(22) Filed: Jan. 28, 2019

(65) Prior Publication Data

US 2019/0155476 A1 May 23, 2019

Related U.S. Application Data

(63) Continuation of application No. 14/307,820, filed on Jun. 18, 2014, now abandoned.

(30) Foreign Application Priority Data

Jun. 20, 2013 (KR) .................. 10-2013-0070866

(51) Int. Cl.
*G06F 3/0487* (2013.01)
*G06F 1/16* (2006.01)
(Continued)

(52) U.S. Cl.
CPC .......... *G06F 3/0487* (2013.01); *G06F 1/1624* (2013.01); *G06F 1/1652* (2013.01);
(Continued)

(58) Field of Classification Search
CPC ......... G09G 2340/0407; G09G 3/2092; G09G 2340/04; G09G 2380/02; G06F 3/0487;
(Continued)

(56) References Cited

U.S. PATENT DOCUMENTS 6,774,819 B1 8/2004 Falconer
6,936,190 B2 8/2005 Yoshida
(Continued)

FOREIGN PATENT DOCUMENTS

KR 10-2005-0085412 A 8/2005
KR 10-2005-0118266 A 12/2005
(Continued)

OTHER PUBLICATIONS

Korean Notice of Patent Grant dated Oct. 10, 2019.
Korean Search Report dated Apr. 19, 2019.

*Primary Examiner* — Jeff Piziali
(74) *Attorney, Agent, or Firm* — Cha & Reiter, LLC

(57) ABSTRACT

An electronic device having a flexible display and method of providing the same are disclosed herein. A flexible display is disposed on at least a portion of an area of the electronic device and configured to egress or ingress from at least one housing of the electronic device to alter an exposed area of the flexible display. At least one processor operatively coupled to the flexible display is configured to detect the exposed area of the flexible display altered by egress or ingress of the flexible display from the housing, detect a setting mode based on the altered exposed area of the flexible display; and execute at least one of changing a resolution setting, changing an operation mode, and changing a user interface setting of the flexible display based on the detected setting mode.

9 Claims, 18 Drawing Sheets

(51) Int. Cl.
*G09G 3/20* (2006.01)
*G09G 3/00* (2006.01)

(52) U.S. Cl.
CPC ............ *G06F 1/1677* (2013.01); *G09G 3/035* (2020.08); *G09G 3/2092* (2013.01); *G09G 2340/04* (2013.01); *G09G 2340/0407* (2013.01)

(58) Field of Classification Search
CPC .... G06F 1/1624; G06F 1/1652; G06F 1/1677; G06F 3/04817; G06F 3/0484; G06F 9/44; G06F 2203/04102
See application file for complete search history.

(56) References Cited

U.S. PATENT DOCUMENTS

| | | |
|---|---|---|
| 7,558,057 B1 | 7/2009 | Naksen et al. |
| 7,724,508 B2 | 5/2010 | Bemelmans et al. |
| 8,009,421 B2 | 8/2011 | Misawa |
| 8,009,422 B2 | 8/2011 | Misawa |
| 8,576,555 B2 | 11/2013 | Misawa |
| 9,485,341 B2 | 11/2016 | Park et al. |
| 2001/0003450 A1 | 6/2001 | Hemia et al. |
| 2003/0071259 A1 | 4/2003 | Koshida |
| 2005/0176470 A1* | 8/2005 | Yamakawa ............ G09G 3/001 455/566 |
| 2006/0007139 A1* | 1/2006 | Ong ...................... G06F 1/1677 345/157 |
| 2006/0007368 A1* | 1/2006 | Slikkerveer ............ G09F 11/29 349/58 |
| 2006/0034039 A1* | 2/2006 | Van Rens ............. G06F 1/1601 361/679.29 |
| 2006/0107566 A1* | 5/2006 | Van Rens ................. G09F 9/35 40/515 |
| 2010/0186272 A1* | 7/2010 | Ophoff .................. G09F 11/295 40/467 |
| 2013/0058063 A1* | 3/2013 | O'Brien ................ G06F 1/1652 361/807 |
| 2014/0247544 A1* | 9/2014 | Ryu ..................... H05K 5/0226 361/679.01 |

FOREIGN PATENT DOCUMENTS

| | | | |
|---|---|---|---|
| KR | 10-0734419 B1 | 7/2007 | |
| KR | 100734419 B1 * | 7/2007 | |
| WO | WO-2012020983 A2 * | 2/2012 | ......... G09F 15/0062 |
| WO | 2013/033479 A2 | 3/2013 | |

* cited by examiner

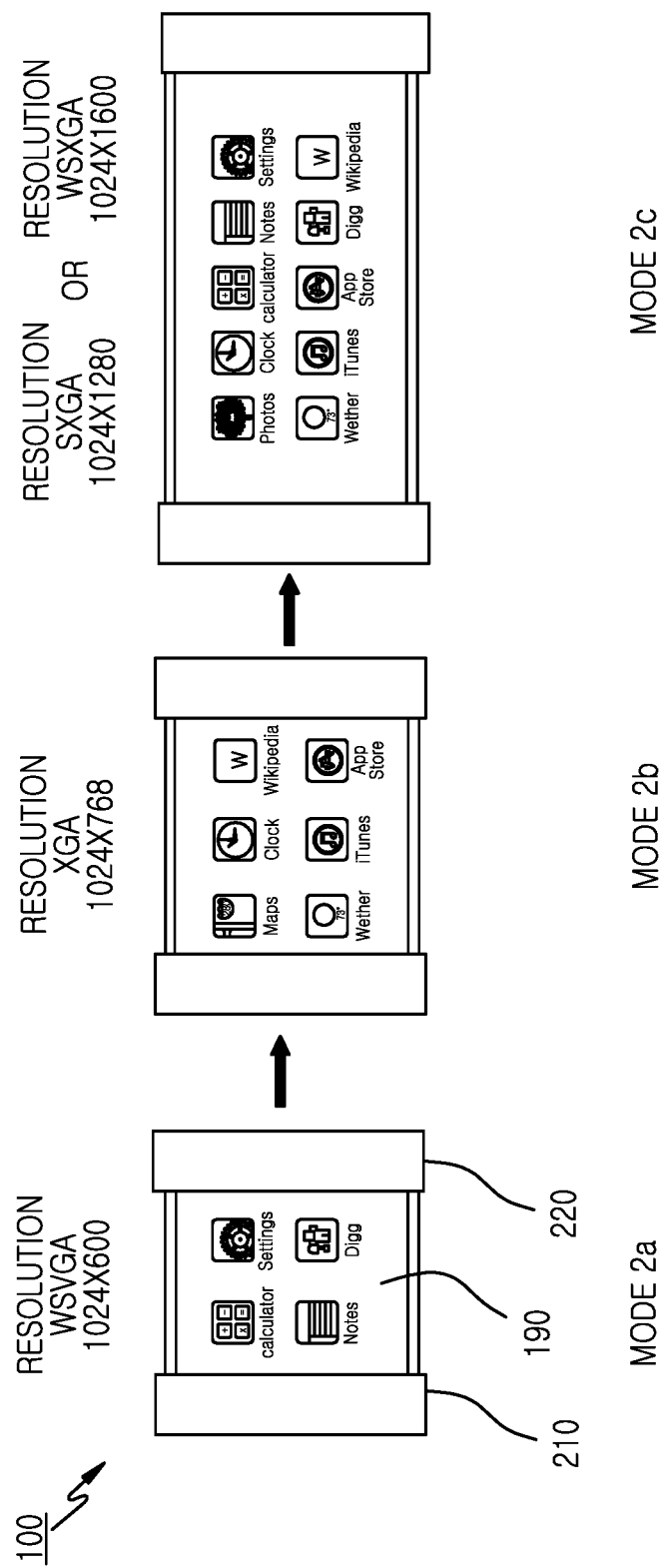

ELECTRONIC DEVICE HAVING FLEXIBLE DISPLAY AND OPERATING METHOD THEREOF

CROSS REFERENCE TO RELATED APPLICATION

This application is a Continuation of U.S. patent application Ser. No. 14/307,820 filed on Jun. 18, 2014 which claims priority under 35 U.S.C. § 119 to an application filed in the Korean Intellectual Property Office on Jun. 20, 2013 and assigned Serial No. 10-2013-0070866, the entire disclosure of which is hereby incorporated by reference.

TECHNICAL FIELD

The present disclosure relates to an electronic device having a flexible display and operation method thereof.

BACKGROUND

Recently, there has been increasing interest in electronic devices employing a flexible display. The flexible display is playing a great role in leading the limited field of related-art displays. For example, the flexible display has been utilized in new fields such as in e-books, which are substituted for paper books and magazines, or in micro Personal Computers (PC) in which a display can be folded or rolled up to be carried.

However, since the flexible display is often configured and used as an existing non-flexible displays, except for the merit that it can be bent, electronic devices employing the flexible display do not guarantee reliability, and do not encourage users to purchase then. In addition, the users typically desire a big screen in a static configuration in most contexts, but desire smaller electronic devices in a certain contexts, which may benefit from a dynamic user configuration.

SUMMARY

An aspect of the present disclosure provides an electronic device which includes a housing in which a flexible display is accommodated and a method for operating thereof.

Another aspect of the present disclosure is to provide an electronic device which can maintain a shape of a flexible display and a method for operating thereof.

Another aspect of the present disclosure is to provide an electronic device which adjusts a shape of the electronic device according to a situation and provides a user interface according to the shape of the electronic device, and a method for operating thereof. In one aspect of the disclosure, an electronic device having a flexible display is disclosed. A flexible display is disposed on at least a portion of an area of the electronic device and configured to egress or ingress from at least one housing of the electronic device to alter an exposed area of the flexible display. At least one processor operatively coupled to the flexible display is configured to detect the exposed area of the flexible display altered by egress or ingress of the flexible display from the housing, detect a setting mode based on the altered exposed area of the flexible display, and execute at least one of changing a resolution setting, changing an operation mode, and changing a user interface setting of the flexible display based on the detected setting mode.

In one aspect of this disclosure, a method for implementing a flexible display in an electronic device is provided, the method including detecting an exposed area of a flexible display altered by egress or ingress of the flexible display from a housing of the electronic device, detecting a setting mode based on the altered exposed area of the flexible display, and performing at least one of a changing a resolution setting, changing an operation mode, and changing a user interface setting of the flexible display based on the detected setting mode.

BRIEF DESCRIPTION OF THE DRAWINGS

FIG. 1B is a view showing an example of use of an electronic device according to one example embodiment of the present disclosure;

DETAILED DESCRIPTION

Various embodiments of the present disclosure will be described herein below with reference to the accompanying drawings. In the following description, well-known functions or implementation will not be described in detail since they would obscure the disclosure in unnecessary detail. Also, the terms used herein are defined according to the functions of the present disclosure. Thus, the terms may vary depending on a user's or operator's intention and usage. That is, the terms used herein may be understood based on the descriptions made herein.

An electronic device of the present disclosure includes a flexible display. The flexible display may be deformed into different shapes using techniques such as stretching, contracting, bending, folding, twisting, crooking, unfolding, etc., and one or more elements of the electronic device, such as the flexible display, may be subject to such deformation.

Figure 1A:
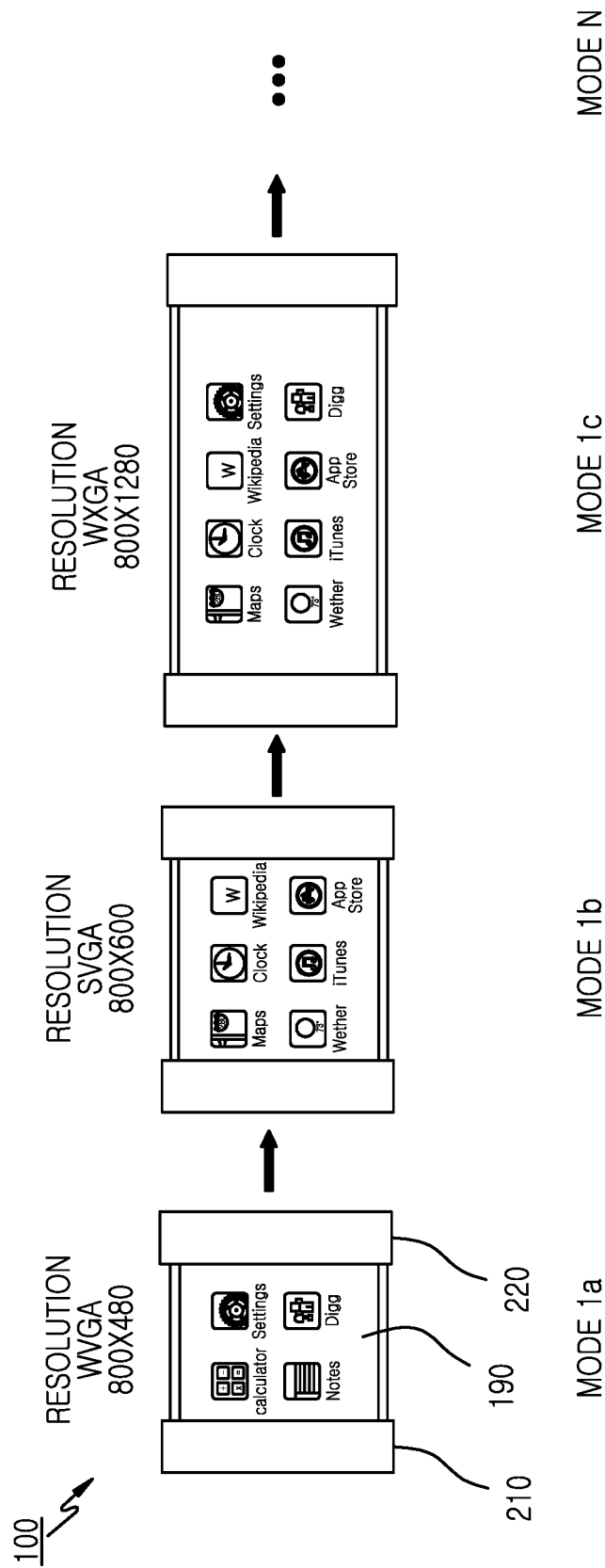
FIG. 1A is a view showing an example of use of an electronic device according to one example embodiment of the present disclosure.

FIGS. 1A and 1B are views illustrating an example of use of an electronic device according to one of various example embodiments of the present disclosure. As show in FIGS. 1A and 1B, as the user stretches the electronic device 100 outwards, a screen of the electronic device 100 is increasingly exposed. The electronic device 100 further includes a flexible display 190 disposed on one surface of the electronic device 100. A first housing 210 and a second housing 220 are disposed on opposite sides of the flexible display 190. The above-described flexible display 190 is configured to egress or ingress from the at least one of the first housing 210 or the second housing 220, as shown in the drawings.

According to various example embodiments, the electronic device 100 may perform at least one of a resolution setting change, an operation mode change, or a user interface setting change of the flexible display 190 according to a detected exposed area of the screen. For example, the resolution setting change may refer to changing a resolution to a resolution corresponding to the exposed area of the flexible display 190. The operation mode change may refer to changing a software or hardware device mode such as a smartphone mode or a tablet PC mode. In addition, the user interface setting change may include at least one of an icon arrangement state change, an icon size change, or a change of the number of icons.

The exposed area may be detected based on an exposed area of the flexible display 190, a length of the flexible display 190 in a direction, a pixel location of a current resolution based on horizontal and vertical pixel counts of the flexible display 190, or a pre-defined location on the flexible display 190 through a sensor.

For example, the electronic device 100 may detect the extent to which the flexible display 190 has egressed or ingressed from the housing, thus defining the exposed area of the flexible display 190. The electronic device 100 may include a sensor device 140, including at least one of a tension sensor, a hall sensor, an illuminance sensor, an image sensor, or a variable resistance sensor. The tension sensor may detect the extent of the exposed area of the flexible display 190 by measuring a tension in an area where the flexible display 190 has egressed or ingressed from the housing. According to one example embodiment, the extent to which the flexible display 190 has egressed or ingressed may be detected based on an electromagnetic signal or mechanical signal in the area where the flexible display 190 has egressed or ingressed from the housing.

According to various embodiments, the exposed area of the flexible display 190 may be part of the area where the display has egressed.

According to various example embodiments, the electronic device 100 may detect a setting mode based on the exposed area or resolution of the flexible display 190. For example, the electronic device 100 may detect the setting mode by comparing the exposed area or resolution of the flexible display 190 with a pre-defined setting value. In addition, when the setting mode falls out of a range of the pre-defined setting value as a result of being compared with the pre-defined setting value, the electronic device 100 may output a display readjustment request using at least one of a vibration, a Light Emitting Diode (LED), a text, an image, or voice data.

According to an example embodiment, the resolution setting value of the above-described flexible display 190 may be set as indicated in table 1:

TABLE 1

| DISPLAY SETTING MODE | DISPLAY RESOLUTION(PPI) | | EXPOSED AREA RATIO OF THE SCREEN (HEIGHT:WIDTH) | GRAPHICS STANDARD |
|---|---|---|---|---|
| | VERTICAL RESOLUTION | HORIZONTAL RESOLUTION | | |
| 1a | 800 | 480 | 5:3 | WVGA |
| 1b | | 600 | 4:3 | SVGA |
| 1c | | 1280 | 10:16 | WXGA |
| 2a | 1024 | 600 | 16:9 | WSVGA |
| 2b | | 768 | 4:3 | XGA |
| 2c | | 1280 | 4:5 | SXGA |
| | | 1600 | 9:16 | WSXGA |
| 3a | 1280 | 720 | 16:9 | 720P |
| 3b | | 800 | 16:10 | WXGA |
| 3c | | 1024 | 5:4 | SXGA |
| 3d | | 1920 | 9:16 | 1280P |

Referring to Table 1, according to an example embodiment, when the display setting mode is 1a, the display resolution (in pixels per inch or "ppi") may have a vertical resolution of 800 ppi and a horizontal resolution of 480 ppi. In this case, an exposed area ratio (height:width) of the screen may be 5:3. In addition, Wide Video Graphic Array (WVGA) may be applied as a graphic standard.

According to various example embodiments, when the display setting mode is changed from 1a to 1b, the display resolution may have the vertical resolution of 800 ppi and horizontal resolution of 480 ppi changed to a horizontal resolution of 600 ppi. In this case, the aspect ratio of the screen (height:width) may be changed from 5:3 to 4:3, and the graphic standard may be changed to Super Video Graphic Array (SVGA).

Referring to FIG. 1A, according to various example embodiments, the electronic device 100 may configure a user interface according to the display setting mode. For example, when the display setting mode is 1a, four icons may be displayed on the screen. In addition, when the display setting mode is changed from 1a to 1b and to 1c, at least one of the icon arrangement state, the icon size, or the number of icons, which are displayed on the screen may be changed.

Referring to FIG. 1B, the above-described display setting mode may include a plurality of setting modes. When the display setting mode is 2c, the resolution of the display and the user interface may be selectively set. According to various example embodiments, the above-described electronic device 100 may change, in addition to the user interface of the electronic device 100, the hardware device mode to the smartphone or tablet PC mode, wherein the device is configured to perform as a smartphone or a tablet PC, respectively.

Figure 2A:
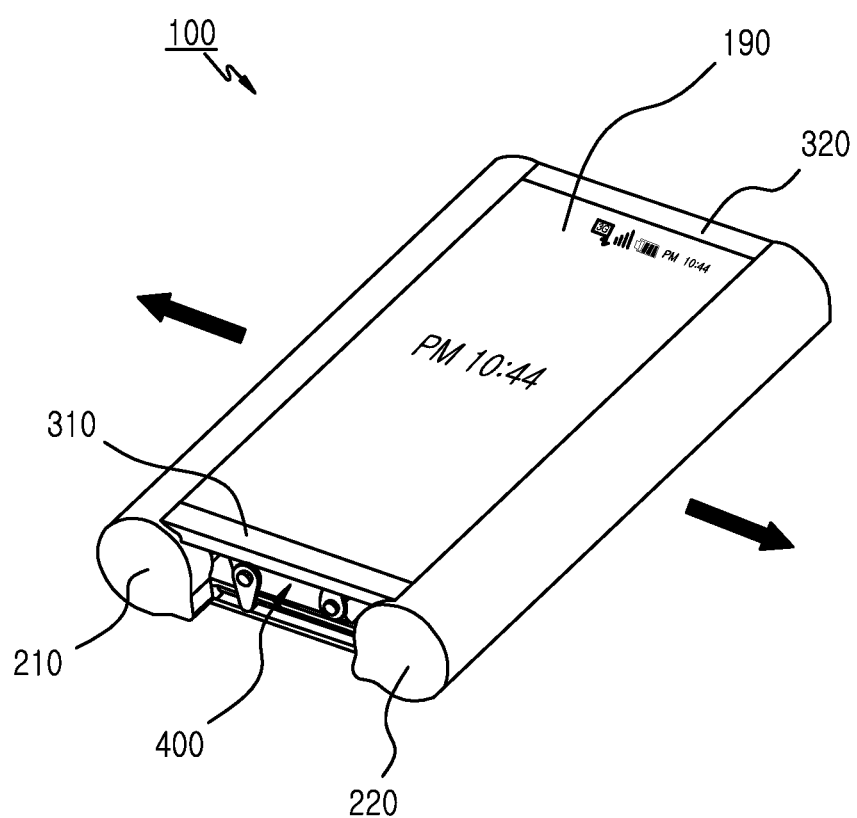
FIG. 2A is a perspective view of an example electronic device according to one example embodiment of the present disclosure.
Figure 2B:
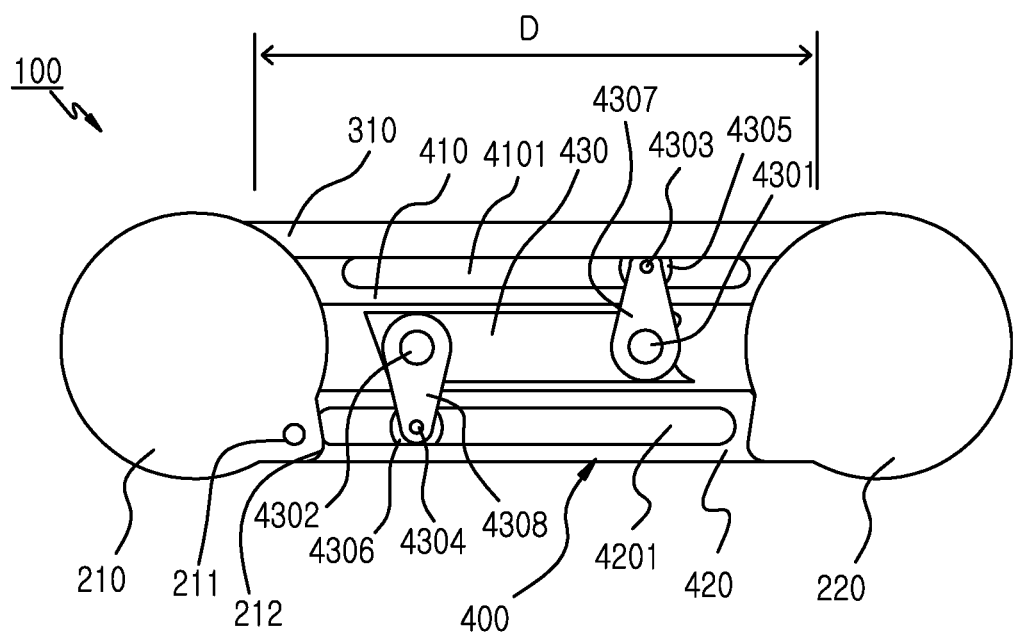
FIG. 2B is a side view of an example electronic device according to one of various example embodiments of the present disclosure.

FIG. 2A is a perspective view of an example electronic device according to one of various example embodiments of the present disclosure, and FIG. 2B is a side view of the example electronic device according to one of various example embodiments of the present disclosure. The electronic device 100 may include a flexible display 190, a first housing 210, a second housing 220, a first guide member 310, a second guide member 320, a support device 400, and a circuit board (not shown).

The flexible display 190 may be disposed on one surface of the electronic device 100 and interposed between the first housing 210 and the second housing 220. In addition, the flexible display 190 may be deformed into at least one of a plurality of different shapes by means such as, for example, stretching, contracting, bending, folding, twisting, crooking, unfolding, etc. The flexible display 190 may be disposed on one surface of the electronic device 100, and may display a signal from the circuit board as an image. In addition, the flexible display 190 may possess a requisite degree of elasticity and be thus configured to egress or ingress from an inner space of at least one of the first housing 210 or the second housing 220. In addition, the outer surface of the flexible display 190 may be extended to outer surfaces of the first guide member 310 and the second guide member 320, which are formed on edges of the flexible display 190 without a step height.

Referring to FIG. 2B, according to an example embodiment, the first housing 210 may be disposed on one end of the flexible display 190 and may be connected with a first link 410 of the support device 400. In addition, the first housing 210 may be connected with a second link 420 of the support device 400 by means of a pin 211 to be able to pivot on the second link 420 by a predetermined angel. A protrusion 212 may be formed on one side of the first housing 210 to facilitate the above-described pivotal movement.

Figure 7A:
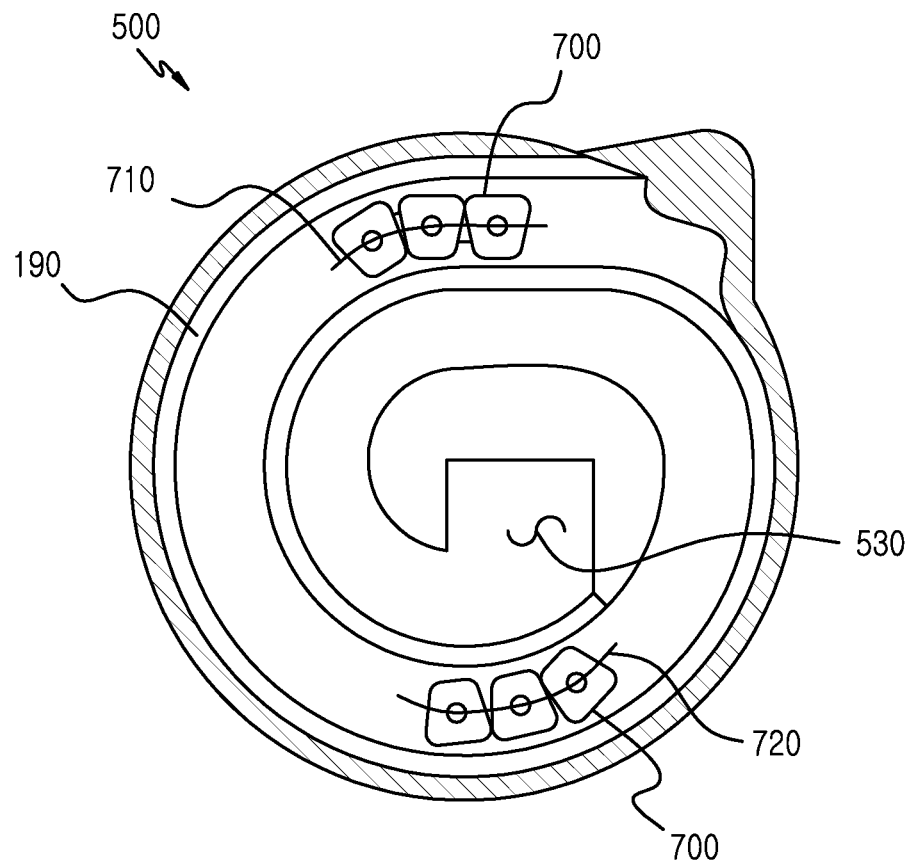
FIG. 7A is a cross sectional view of an example housing according to one of various example embodiments of the present disclosure.

Referring to FIG. 7A, according to various example embodiments, the first housing 210 may include an inner space to allow one side of the first guide member 310 and the flexible display 190 to be come in or come out.

Referring to FIG. 2B, the second housing 220 may be disposed on the other end of the flexible display 190 and may be fixed with the first link 410 of the support device 400. In addition, the second housing 220 may be connected with the second link 420 of the support device 400. The second housing 220 may include an inner space to allow the other side of the flexible display 190 to ingress into the second housing 220.

According to various example embodiments, the extent to which the flexible display 190 may egress or ingress from the first housing 210 and the extent to which the flexible display 190 may egress or ingress from the second housing 220 may be identical to one another, or different from one another. For example, the flexible display 190 may egress or ingress from one housing, with or without a corresponding egress or ingress from the other housing.

Figure 3A:
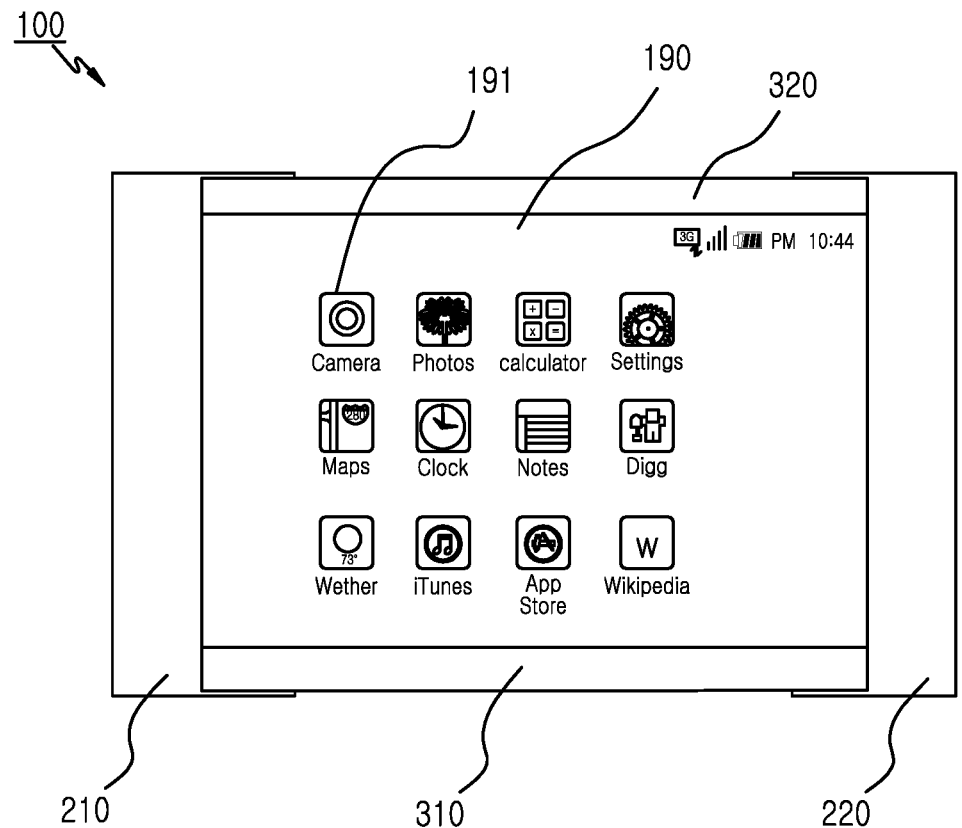
FIG. 3A is a plane view of an example electronic device according to one of various example embodiments of the present disclosure.

Referring to FIG. 3A, according to an example embodiment, the first guide member 310 and the second guide member 320 may be disposed near to the flexible display 190 and may guide the flexible display 190 to be come in or come out of the above-described housing. In addition, the outer surfaces of the guide members 310 and 320 may be extended to the outer surface of the flexible display 190 without a step height. The above-described guide members 310 and 320 may be attached to an upper portion or a lower portion of the flexible display 190.

According to various example embodiments, the above-described guide members 310 and 320 may be implemented in the form of an electromagnet or a chain to support the flexible display 190. For example, when the guide members 310 and 320 are implemented in the form of the electromagnet, the guide members 310 and 320 may include an electromagnetic plate or a magnetic substance. For example, the electromagnetic plate is configured flexibly to allow the flexible display 190 to be come in or come out before voltage is applied to the electromagnetic plate (initial state), and is changed to a rigid structure when a voltage is applied to the electromagnetic plate such that the electromagnetic plate is not pressed in a direction of a pressing force of the flexible display 190.

According to various example embodiments, when the guide members 310 and 320 are implemented in the form of the chain, the guide members 310 and 320 may include a roller chain which connects a roller link and a pin link having a predetermined rigidity to each other by means of a pin. For example, the chain includes a plurality of unit pieces and the unit pieces are articulated with one another. A connector between the unit pieces of the chain may have mechanical or electrical friction, attraction, and resistance. The user may fold or unfold between the unit pieces by applying a force of more than a predetermined level.

Referring to FIG. 2A, according to various example embodiments, the support device 400 may be disposed on one surface of the flexible display 190 and may support at least a part of the flexible display 190. For example, the support device 400 may include the first link 410, the second link 420, and a third link 430.

Referring to FIG. 2B, according to an example embodiment, the first link 410 may be disposed near to the flexible display 190 and has one side connected with the second housing 220. In addition, the other side of the first link 410 may be fitted into the above-described first housing 210. For example, the first link 410 may include a recess 4101 to allow the third link 430 to be link-connected therewith and to operate.

According to various example embodiments, the second link 420 may be disposed near to the third link 430 and has one side connected with the first housing 210 by means of the pin 211 to allow the first housing 210 to pivot by a predetermined angle. In addition, the other side of the second link 420 may be fitted into the above-described second housing 220. For example, the second link 420 may include a recess 4201 of a predetermined length to allow the third link 430 to be connected therewith and to operate by a predetermined distance.

According to various example embodiments, the third link 430 may be disposed to overlap at least a part of the first link 410 and at least a part of the second link 420 (as seen in FIG. 2B), and may include a first connection member 4307 and a second connection member 4308 link-connected with the first link 410 and the second link 420.

According to various example embodiments, the first connection member 4307 may be connected with the third link 430 by means of a pin 4301, and may be connected with a first rotary body 4305 which is operable along the recess 4101 of the first link 410 by a predetermined distance by means of a pin 4303. The second connection member 4308 may be connected with the third link 430 by means of a pin 4302, and may be connected with a second rotary body 4306 which is operable along the recess 4201 of the second link 420 by a predetermined distance by means of a pin 4304.

Figure 3B:
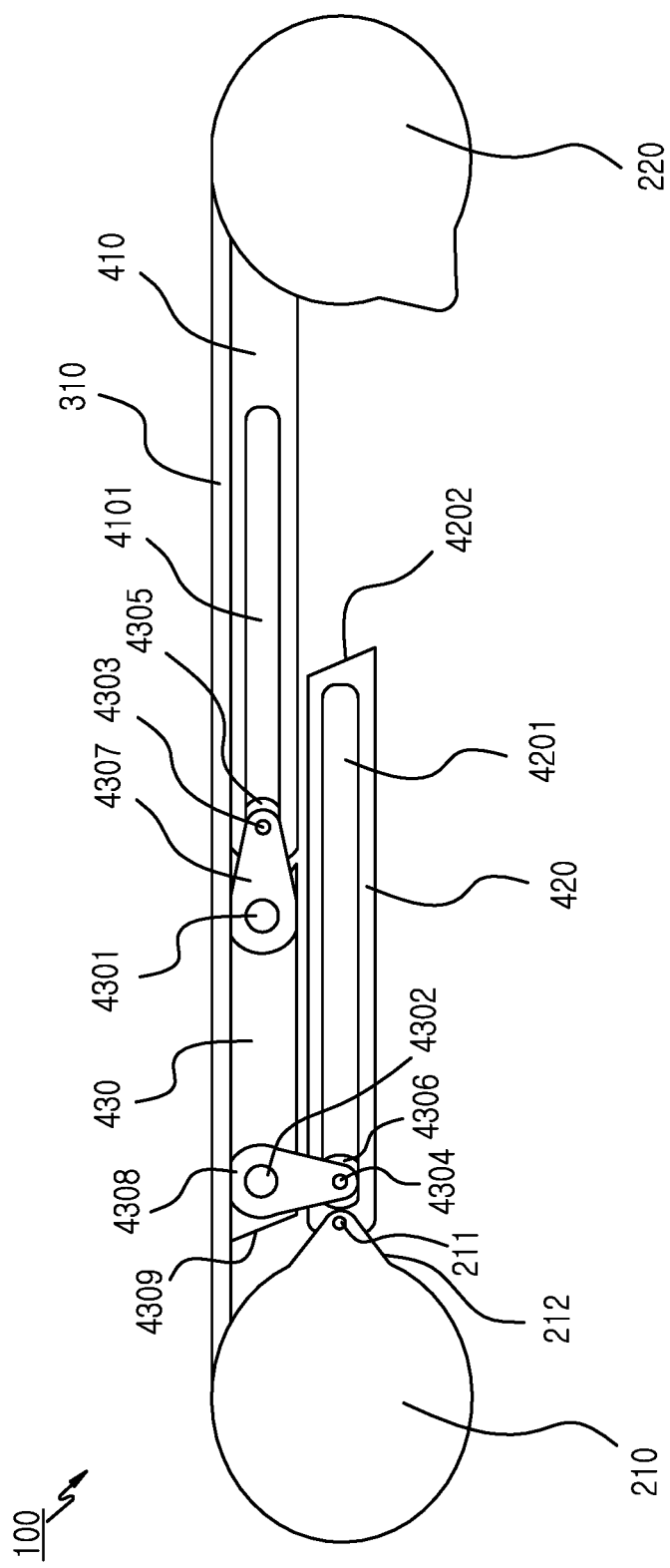
FIG. 3B is a side view of an example electronic device according to one of various example embodiments of the present disclosure.

Such a link structure of the support device 400 enables the second link 420 and the third link 430 described above to be rotated freely. The support device 400 may be changed in its shape according to various mechanical structures in addition the above-described link structure (as seen in FIG. 2B, FIG. 3B, and FIG. 4B)

According to various example embodiments, the circuit board is a substrate in which a basic circuit and a plurality of electronic parts are sealed, and sets an execution environment of the electronic device 100, maintains its information, stably drives the electronic device 100, and facilitates input and output exchange of data of all devices of the electronic device 100. The circuit board transmits a signal to the flexible display 190 and the flexible display 190 may display the signal from the circuit board as an image. In addition, the circuit board may perform at least one of a resolution setting operation or a user interface setting operation according to the extent of the exposure of the flexible display 190. In addition, the circuit board may be installed in the inner space of the above-described housing.

According to an example embodiment, the electronic device 100 may perform at least one of a resolution setting change, an operation mode change, or a user interface setting change according to an exposed area of the flexible display 190. For example, the resolution setting change may refer to changing a resolution to a resolution corresponding to the exposed area of the flexible display 190. The operation mode change may refer to changing a software or hardware device mode such as a smartphone mode or a tablet PC mode. In addition, the user interface setting change may include at least one of an icon arrangement state change, an icon size change, or a change of the number of icons.

The above-described exposed area may be detected based on an exposed area of the flexible display 190, a length of the flexible display 190 in a moving direction, a pixel location of a resolution of one surface based on horizontal and vertical resolutions of the flexible display 190, or a location pre-defined through a sensor.

For example, the electronic device 100 may detect the extent to which the flexible display 190 is ingressed into the housing, or the exposed area of the flexible display 190. According to an example embodiment, the electronic device 100 may include a sensor device 140 including at least one of a tension sensor, a hall sensor, an illuminance sensor, an image sensor, or a variable resistance sensor. According to an example embodiment, the tension sensor from among these sensors may detect the extent to which the flexible display 190 is come in or the exposed area by measuring a tension in an area where the flexible display 190 is come in or come out of the housing. According to various example embodiments, the extent to which the flexible display 190 is come in or the exposed area may be detected based on an electromagnetic signal or mechanical signal in the area where the flexible display 190 is come in or come out of the housing.

According to various example embodiments, the electronic device 100 may determine a setting mode based on the exposed area or resolution of the flexible display 190. For example, the electronic device 100 may determine the setting mode by comparing the exposed area or resolution of the flexible display 190 with a pre-defined setting value. In addition, when the setting mode falls out of a range of the pre-defined setting value as a result of being compared with the pre-defined setting value, the electronic device 100 may control to output a display readjustment request. The readjustment request may be output by using at least one of a vibration, an LED, a text, an image, or voice data.

FIG. 3A is a plane view of an example electronic device according to one of various example embodiments of the present disclosure, and FIG. 3B is a side view of an example electronic device according to one of various example embodiments of the present disclosure. Referring to FIG. 3A, the electronic device 100 may perform at least one of a resolution setting change, an operation mode change, or a user interface setting change according to an exposed area of the flexible display 190. The above-described exposed area may include an exposed area of the flexible display 190, a length of the flexible display 190 in a moving direction, a pixel location of a resolution of one surface based on horizontal and vertical resolutions of the flexible display 190, or a location pre-defined through a sensor. For example, the number and arrangements of icons 191 corresponding to the area of the display may be set as shown in FIG. 3A.

Referring to FIG. 3B, according to various example embodiments, the above-described third link 430 may be disposed on an upper or lower portion of the second link 420, and may be arranged in alignment with the first link 410. In addition, in this case, the above-described first connection member 4307 and second connection member 4308 are operable along the above-described recesses 4101 and 4201.

According to various example embodiments, one side 4309 of the above-described third link 430 may be inclined and may have an upper portion longer than a lower portion. The third link 430 may be formed to correspond to the second link 420 in a pair bond formation to consider fixation stability. One side 4202 of the above-described second link 420 may be inclined and may have an upper portion shorter than a lower portion. The above-described third link 430 and second link 420 may be configured to be different from each other in lengths of their upper and lower portions and their shapes. This configuration is to make the third link 430 fitted to be arranged in alignment with the second link 420.

Figure 4A:
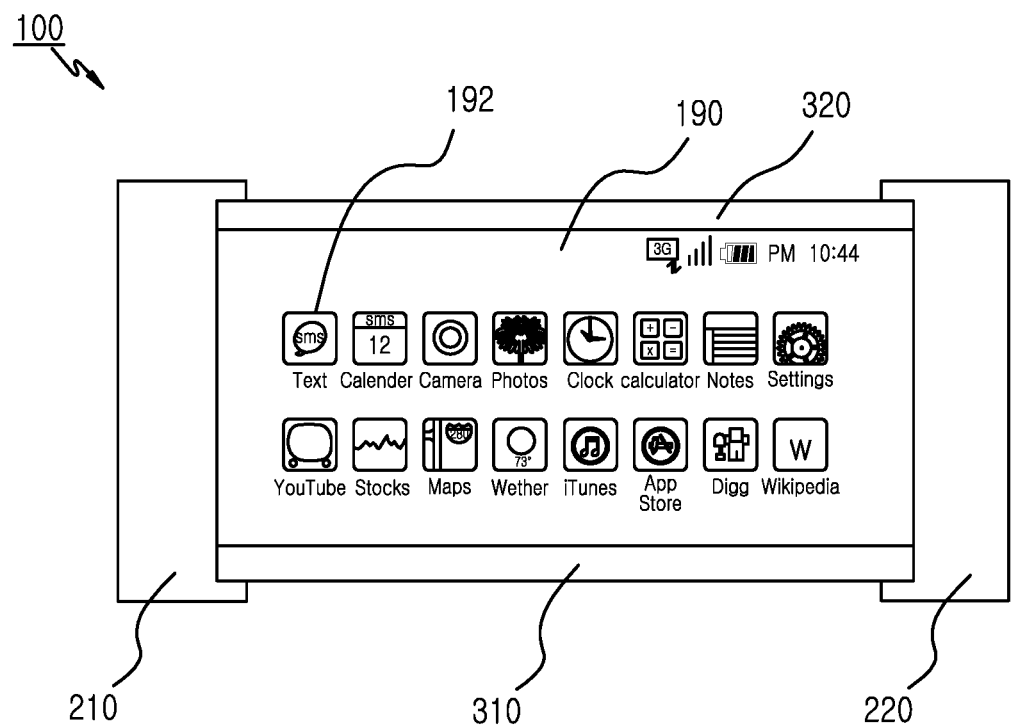
FIG. 4A is a plane view of an example electronic device according to one of various example embodiments of the present disclosure.
Figure 4B:
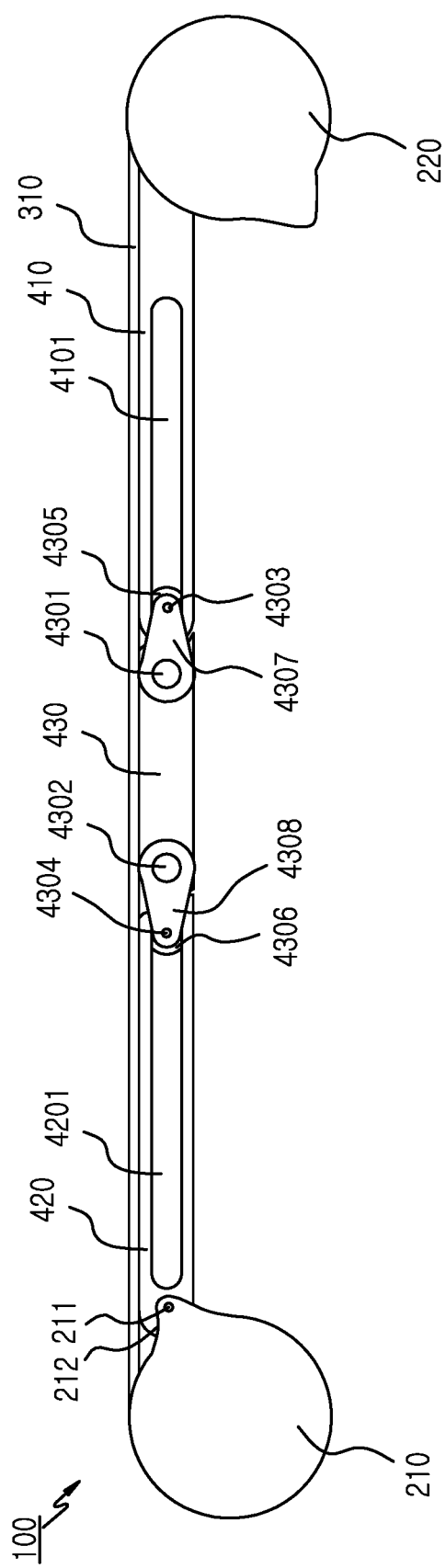
FIG. 4B is a side view of an example electronic device according to one of various example embodiments of the present disclosure.

FIG. 4A is a plane view of an example electronic device according to one of various example embodiments of the present disclosure, and FIG. 4B is a side view of an example electronic device according to one of various example embodiments of the present disclosure.

Referring to FIG. 4A, according to various example embodiments, the electronic device 100 may perform at least one of a resolution setting change, an operation mode change, or a user interface setting change according to an exposed area of the flexible display 190. The above-described exposed area may include an exposed area of the flexible display 190, a length of the flexible display 190 in a moving direction, a pixel location of a resolution of one surface based on horizontal and vertical resolutions of the flexible display 190, or a location pre-defined through a sensor.

For example, when the display is exposed as shown in the drawings, the number and arrangements of icons 192 corresponding to the exposed area may be set. In addition, not the user interface of the electronic device 100 but also the hardware device mode such as a smartphone or tablet PC mode may be changed.

Referring to FIG. 4B, according to an example embodiment, the third link 430 may be interposed between the first link 410 and the second link 420, and an outer surface of the above-described third link 430 may be extended to outer surfaces of the first link 410 and the second link 420 without a step height.

Figure 5:
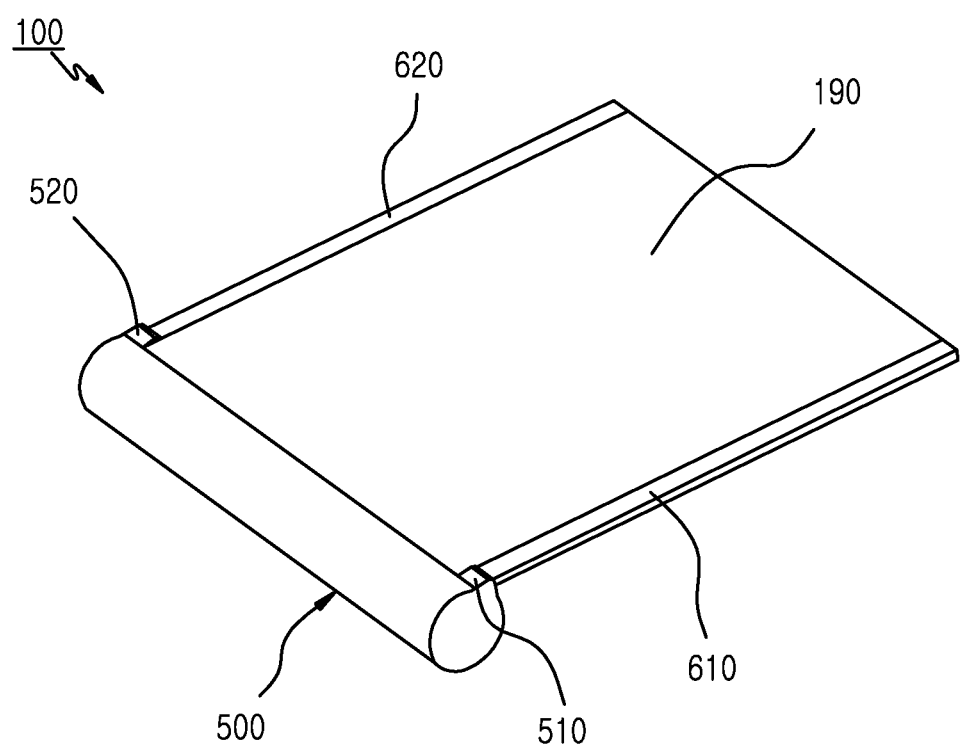
FIG. 5 is a perspective view of an example electronic device according to one of various example embodiments of the present disclosure.
Figure 6:
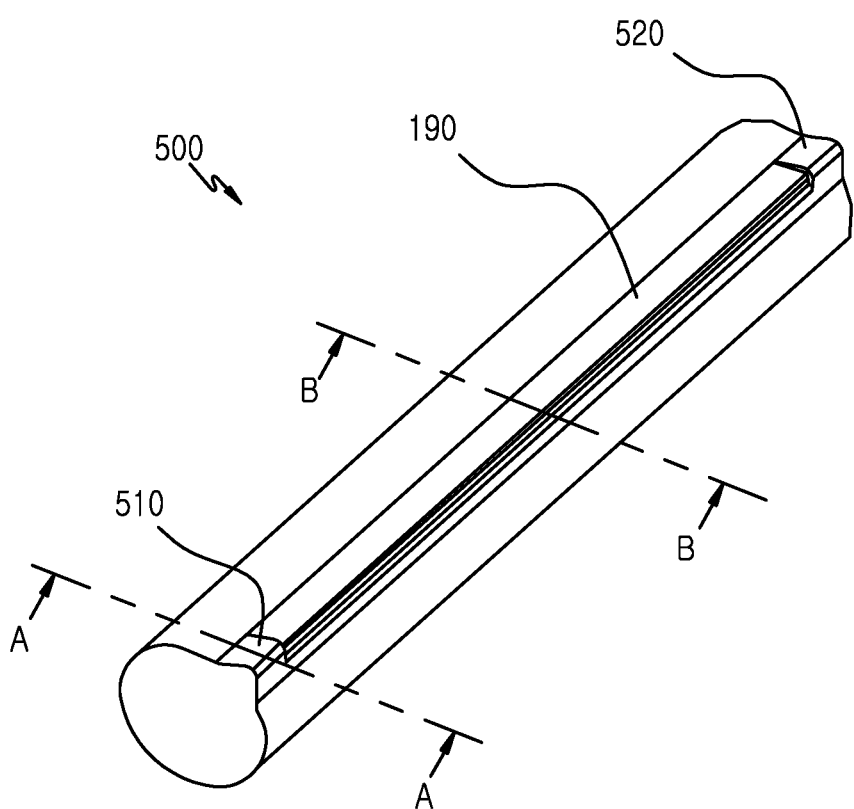
FIG. 6 is an exploded perspective view of an example housing according to one of various example embodiments of the present disclosure.

FIG. 5 is a perspective view of an example electronic device according to one of various example embodiments of the present disclosure, and FIG. 6 is an exploded perspective view of an example housing according to one of various example embodiments of the present disclosure.

Referring to FIGS. 5 and 6 the electronic device 100 according to various example embodiments may include a housing 500, a flexible display 190, a first guide member 610, and a second guide member 620. The housing 500 may be disposed on one surface of the flexible display 190, may have an inner space to allow the flexible display 190, the first guide member 610, and the second guide member 620 to egress or ingress, and may include a first protrusion 510 and a second protrusion 520 which are connected with the first guide member 610 and the second guide member 620.

According to various example embodiments, the above-described guide members 610 and 620 may be disposed on an edge, an upper portion, or a lower portion of the flexible display 190, may egress or ingress through the above-described protrusions 510 and 520, and may guide the flexible display 190 to egress or ingress from the housing 500. For example, the guide members 610 and 620 may be implemented in the form of an electromagnet or magnetic substance, or a chain to support the flexible display 190.

For example, when the guide members 610 and 620 are implemented in the form of the electromagnet, the above-described guide members 610 and 620 may be an electromagnetic plate including a magnetic substance. For example, the electromagnetic plate is configured flexibly to allow the flexible display 190 to egress or ingress before a voltage is applied to the electromagnetic plate, and is changed to a rigid structure when a voltage is applied to the electromagnetic plate, such that the electromagnetic plate is not pressed in a direction of a pressing force of the flexible display 190. In addition, when the guide members 610 and 620 are implemented in the form of the chain, the guide members 610 and 620 may include a roller chain which connects a roller link and a pin link having a predetermined rigidity with each other by means of a pin.

For example, the chain includes a plurality of unit pieces and the unit pieces are articulated with one another. A connector between the unit pieces of the chain may have mechanical or electrical friction, attraction, and resistance. The user may fold or unfold between the unit pieces by applying a force of more than a predetermined level.

Figure 7B:
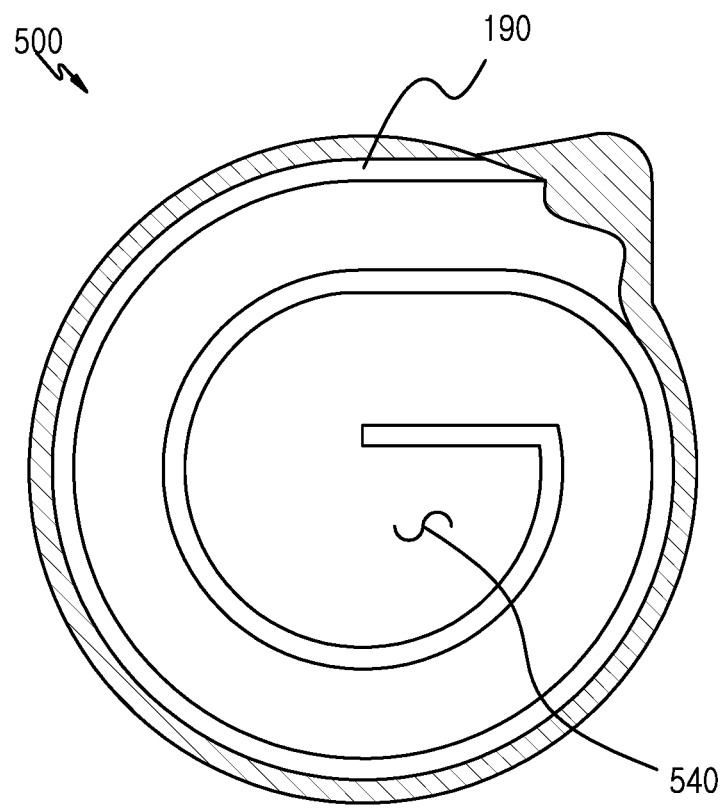
FIG. 7B is a cross sectional view of an example housing according to one of various example embodiments of the present disclosure.

FIG. 7A is a cross sectional view of an example housing according to one of various example embodiments of the present disclosure, and FIG. 7B is a cross sectional view of an example housing according to one of various example embodiments of the present disclosure. FIG. 7A and FIG. 7B may represent, in one embodiment, cross sections taken at lines A-A and B-B of FIG. 6, respectively.

The above-described guide members may be a chain 700 according to various example embodiments. Referring to FIG. 7A, the housing 500 may be formed to have an inner structure 530 in which the flexible display 190 and the chain 700 are rolled up. In addition, the chain 700 may include a roller chain which connects a roller link and a pin link having a predetermined rigidity with each other by means of a pin. The chain 700 can maintain a shape of the flexible display 190, and for example, may include an upper chain, a lower chain, and a shaft.

The upper chain and the lower chain are connected with each other by means of the shaft, and has a rigidity in a horizontal direction and has a flexibility in a vertical direction. The upper chain and the lower chain include a plurality of unit pieces (e.g., the roller links), and the unit pieces are articulated with one another (e.g., via the roller pins). A connector between the unit pieces of the chain may include mechanical or electrical friction, attraction, and resistance. For example, the user may fold or unfold between the unit pieces by applying a force of more than a predetermined level. For example, the connector between the unit pieces of the chain 700 may include an electromagnetic or mechanical means for receiving power from the circuit board and controlling an unintended pivotal movement between the unit pieces caused by a recovering force of the flexible display 190.

According to various example embodiments, the above-described chain 700 may include a hook or pin (not shown) which is inserted between the unit pieces. For example, the above-described hook or pin may be inserted into a joint between the unit pieces of the chain 700, thereby fixing the chain 700.

According to various example embodiments, the chain 700 may have a movement curvature varying according to a location of the inner structure 530. For example, when the chain 700 enters the inner structure 530, a second curvature 720 may be greater than a first curvature 710.

Referring to FIG. 7B, the above-described flexible display 190 may be rolled up in the inner structure 540 of the housing 500. In addition, the flexible display 190 can maintain a predetermined gap between itself and the interior of the housing 500 by being guided by the above-described chain 700, thereby preventing damage to the flexible display 190.

Figure 8:
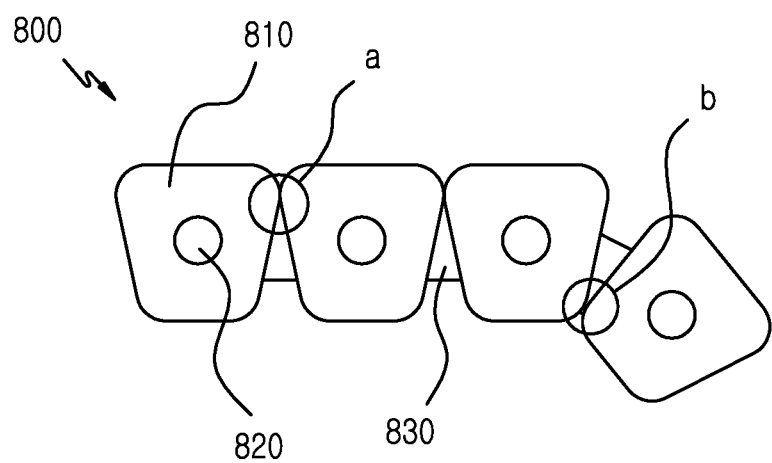
FIG. 8 is a view illustrating an example structure of a chain according to one of various example embodiments of the present disclosure.

FIG. 8 is a perspective view illustrating an example structure of a chain according to one of various example embodiments of the present disclosure. A chain 800 may include a roller chain which connects rollers with a plurality of roller links 810 and a pin link 830 by means of a pin 820, and can provide structure support to better maintain a desired shape of the electronic device 100.

According to various example embodiments, when the roller chain maintains shape in a horizontal orientation, the roller chain has certain upper portions of each roller link 810 brought into contact with one another, as shown in portion 'a' of FIG. 8. Accordingly, the roller chain 800 is not loosened due to the resulting mechanical tension. When the roller chain 800 is curving, the roller chain 800 has its lower portions brought into contact with each other as shown in portion 'b' of FIG. 8, so that the roller chain bent or curved to an undesired degree.

Figure 9:
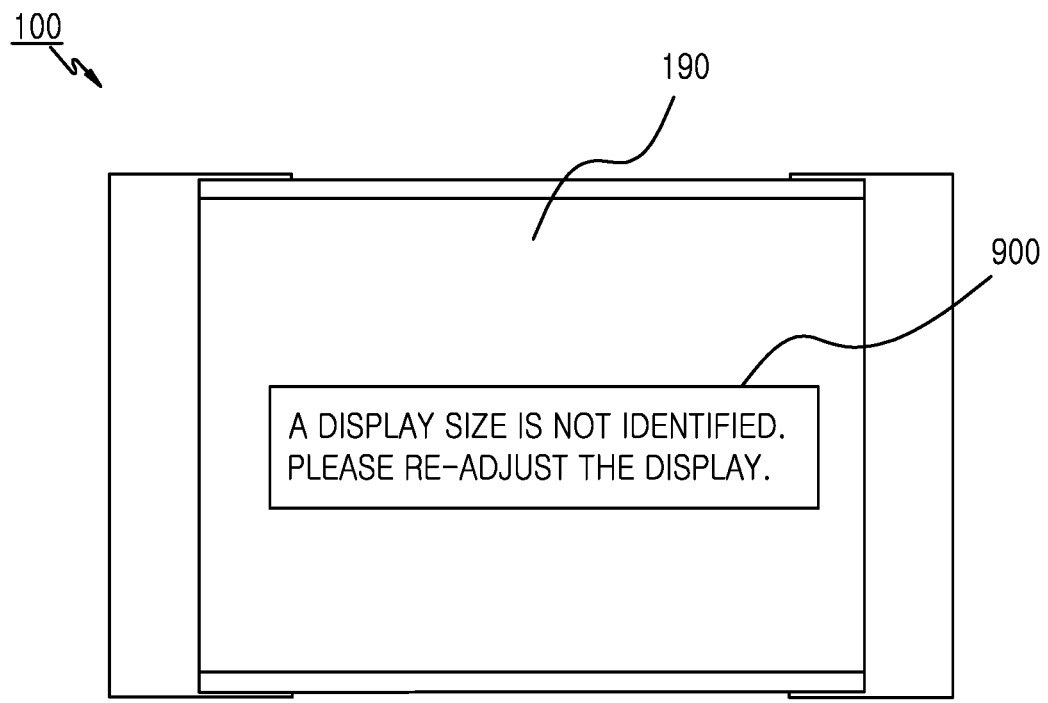
FIG. 9 is a view illustrating an example display readjustment request according to one of various example embodiments of the present disclosure.

FIG. 9 is a view illustrating an example display readjustment request 900 according to one of various example embodiments of the present disclosure. The electronic device 100 may detect a setting mode based on an exposed area or resolution of the flexible display 190. For example, the electronic device 100 may detect the setting mode by comparing the exposed area or resolution of the flexible display 190 with a pre-defined setting value. When the setting mode falls out of a range of the pre-defined setting value, the electronic device 100 may output a display readjustment request 900 through a pop-up window. The display readjustment request 900 may be output by using at least one of a vibration, an LED, a text, an image, or voice data.

Figure 10:
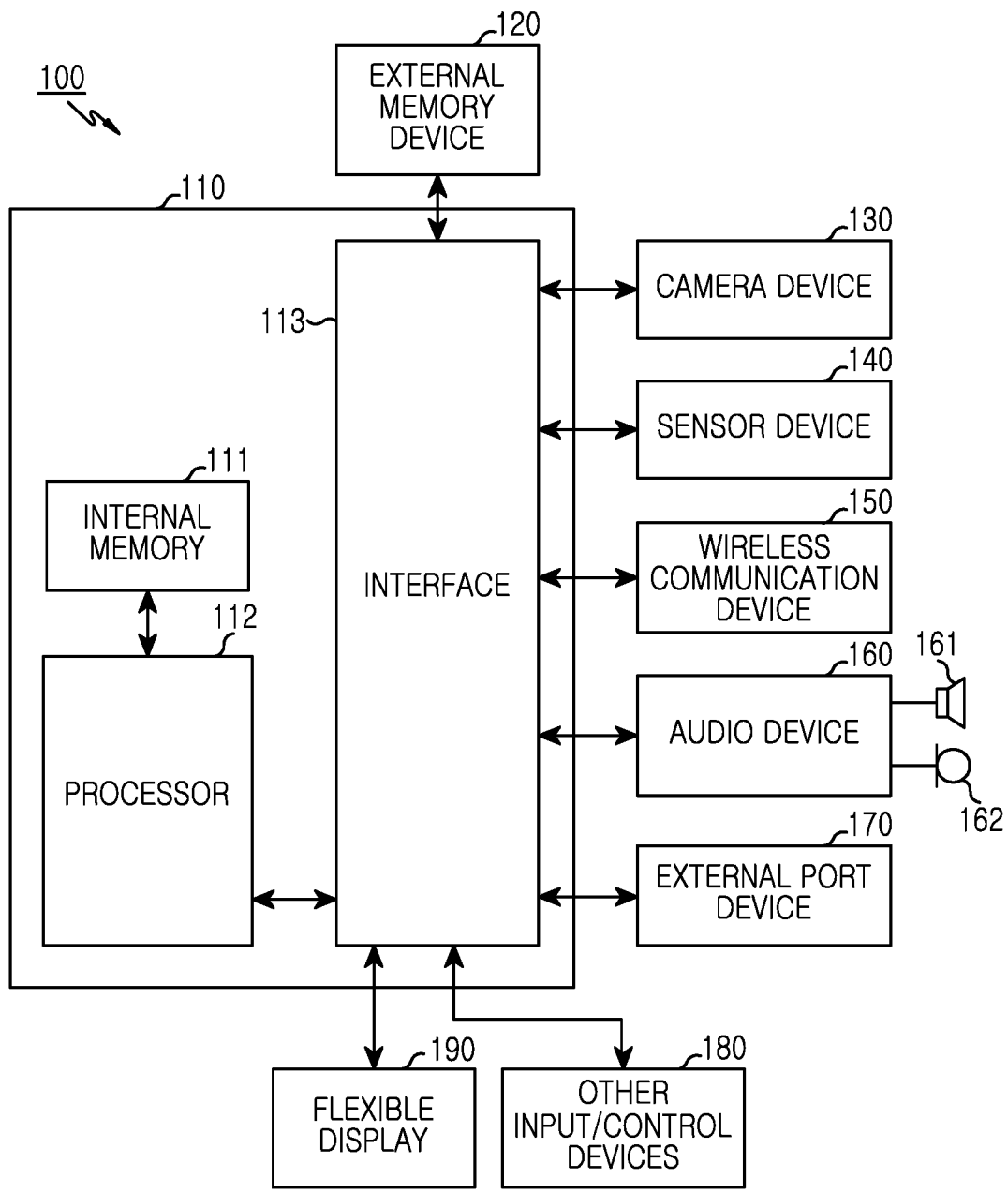
FIG. 10 is a block configuration diagram of an example electronic device according to one of various example embodiments of the present disclosure.

FIG. 10 is a block configuration diagram of an electronic device according to one of various example embodiments of the present disclosure. Referring to FIG. 10, the electronic device 100 may be a device such as a mobile phone, a mobile pad, a media player, a tablet computer, a handheld computer or a Personal Digital Assistant (PDA). In addition, the electronic device 100 may be any electronic device which includes a device combining two or more functions of the above-mentioned devices.

The electronic device 100 may include a host device 110, an external memory device 120, a camera device 130, a sensor device 140, a wireless communication device 150, an audio device 160, an external port device 170, a flexible display 190, and other input/control devices 180. The external memory device 120 and the external port device 170 may be provided in plural number.

The host device 110 may include an internal memory 111, one or more processors 112, or an interface 113. The internal memory 111, the one or more processors 112, or the interface 113 may be separate elements or may be included in one or more integrated circuits.

The processor 112 may perform various functions for the electronic device 100 by executing a plurality of software programs, and may perform processing and controlling for voice communication, video communication, and data communication. In addition to such typical functions, the processor 112 may perform various functions corresponding to a software module (an instruction set) stored in the internal memory 111 or external memory device 120 by executing the software module.

According to various example embodiments, the processor 112 may perform the methods of the example embodiments by interworking with the software modules stored in the internal memory 111 or external memory device 120. In addition, the processor 112 may include one or more data processors, an image processor, or a CODEC. The electronic device 100 may configure the data processor, the image processor, or the CODEC separately.

The interface 113 may connect the various devices of the electronic device 100 and the host device 110.

The camera device 130 may perform camera functions such as shooting and video clip recording. The camera device 130 may include a Charged Coupled Device (CCD) or a Complementary Metal-Oxide Semiconductor (CMOS). In addition, the camera device 130 may change a hardware configuration, for example, may adjust a lens movement or the number of apertures, according to a camera module executed by the processor 112.

Various elements of the electronic device 100 may be connected with one another through one or more communication buses (no reference numeral is used) or electrical connecting means (no reference numeral is used).

The sensor device 140 may include at least one of a tension sensor, a hall sensor, an illuminance sensor, an image sensor, or a variable resistance sensor for sensing motion, light, temperature, tension, deformation, etc. The sensor device 140 may measure information on deformation of the electronic device 100 or the extent of exposure of the flexible display 190, and may transmit this information to the host device 110. For example, the extent of the exposure of the above-described flexible display 190 may include an exposed area of the flexible display 190, a length of the flexible display 190 in a moving direction, a pixel location of a resolution of one surface based on horizontal and vertical resolutions of the flexible display 190, and a location pre-defined through a sensor.

According to an example embodiment, the tension sensor of the sensor device 140 may detect the exposed area of the flexible display 190 by measuring a tension in an area where the flexible display 190 is come in or come out of the housing.

The wireless communication device 150 enables wireless communication and may include a radio frequency transmitter/receiver and a light (for example, infrared ray) transmitter/receiver. The wireless communication device 150 may be designed to operate through one of a Global System for Mobile Communication (GSM) network, an Enhanced Data GSM Environment (EDGE) network, a Code Division Multiple Access (CDMA) network, a Wideband CDMA (W-CDMA) network, an LTE network, an Orthogonal Frequency Division Multiple Access (OFDM) network, a Wireless Fidelity (Wi-Fi) network, a WiMax network, and a Bluetooth network according communication networks.

The audio device 160 may be connected with a speaker 161 and a microphone 162 to perform audio input and output such as voice recognition, voice reproduction, digital recording, and calling. For example, the audio device 160 may enable the electronic device 100 to communicate with the user through the speaker 161 and the microphone 162. In addition, the audio device 160 may receive a data signal from the host device 110, convert the data signal into an electric signal, and output the electric signal through the speaker 161.

The speaker 161 may convert the electric signal into an audible frequency band and output the audible frequency band. The speaker 161 may be disposed on a rear portion of the electronic device 100, and may include a flexible film speaker which has at least one piezoelectric body attached to at least one vibration film. The microphone 162 may convert a sound wave transmitted from a person or other sound sources into an electric signal.

In addition, the audio device 160 may receive the electric signal from the microphone 162, convert the electric signal into an audio data signal, and transmit the audio data signal to the host device 110. The audio device 160 may include an earphone, a headphone, or a headset which is attachable to or detachable from the electronic device 100.

The flexible display 190 may display the signal transmitted from the host device 110 as an image such as a text, a graphic, a video, etc. The flexible display 190 may be deformed into at least one of different shapes, such as stretching, contracting, bending, folding, twisting, crooking, or unfolding, and the electronic device 100 is subject to such deformation. Touch screen technology can be applied to the flexible display 190.

The other input/control devices 180 may include an up/down button for controlling a volume. In addition, the other input/control devices 180 may include at least one of a push button, a locker button, a locker switch, a thumbwheel, a dial, or a pointer device such as a stick and a stylus, which are given corresponding functions.

The external memory device 120 may include one or more high speed Random Access Memories (RAMs) or non-volatile memories such as magnetic disc storage devices, or one or more optical storage devices or flash memories (for example, NAND, NOR). The external memory device 120 stores software and the software may include an operating system module, a communication module, a graphic module, a user interface module, a CODEC module, a display area or resolution detection module, and one or more application modules.

The term "module" may be expressed as a group of instructions, an instruction set, or a program.

The operating system module indicates a built-in operating system such as WINDOWS, LINUX, Darwin, RTXC, UNIX, OS X, or VsWorks, and may include a plurality of software elements for controlling a general system operation. The control of the general system operation may include memory management and control, storage hardware (device) control and management, and power control and management. The operating system module may function to facilitate communication between various hardware elements (devices) and software elements (modules).

The communication module can enable communication with other electronic devices such as a computer, a server, and an electronic device via the wireless communication device 150 or the external port device 170.

The graphic module includes various software elements for providing and displaying graphics on the flexible display 190. The terminology of "graphics" indicates a text, a web page, an icon, a digital image, a video, an animation, etc.

The user interface module includes various software elements related to a user interface. The user interface module includes the content related to how a state of the user interface changes and in which condition the state of the user interface changes.

The CODEC module may include a software element related to encoding and decoding of a video file The display area or resolution detection module may include various software elements for detecting an exposed area of the flexible display 190 or a display resolution according to deformation of the electronic device 100.

The application module includes a browser, an e-mail, an instant message, word processing, keyboard emulation, an address book, a contact list, a widget, a Digital Right Management (DRM), voice recognition, voice reproduction, a location determining function, a location-based service, etc.

The memory 111 may further include additional modules (instructions) in addition to the aforementioned modules. In addition, various functions of the electronic device 100 may be executed by one or more hardware or software elements including stream processing or Application Specific Integrated Circuit (ASIC), or a combination thereof.

Figure 11:
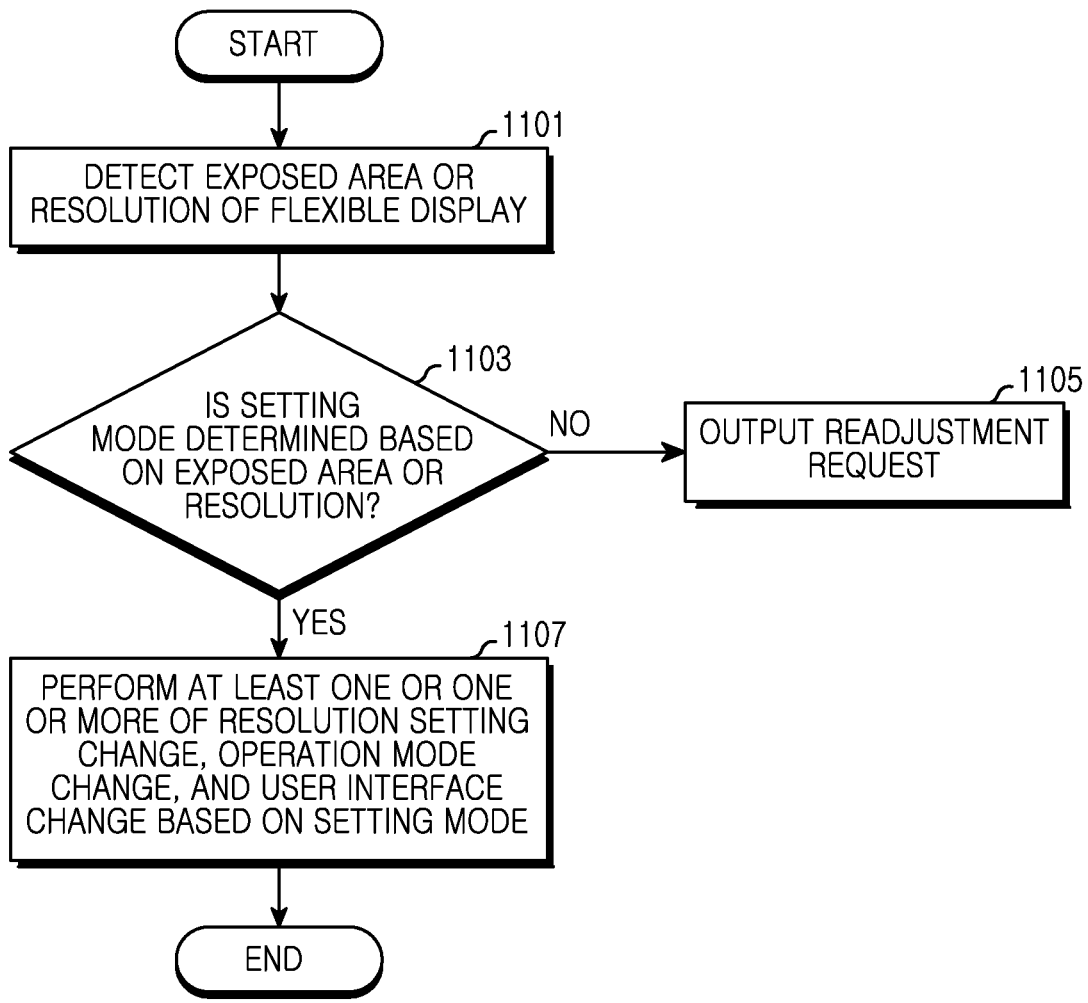
FIG. 11 is a sequence diagram of an example method for operating of an electronic device according to one of various example embodiments of the present disclosure.

FIG. 11 is a sequence diagram illustrating an example method for operating of an electronic device according to one of various example embodiments of the present disclosure. In operation 1101, an exposed area or a resolution of the flexible display 190 is detected. According to an example embodiment, the electronic device 100 may perform at least one of a resolution setting change, an operation mode change, or a user interface setting change according to an exposed area of the flexible display 190. For example, the resolution setting change may refer to changing a resolution to a resolution corresponding to the exposed area of the flexible display 190. The operation mode change may refer to changing a software or hardware device mode such as a smartphone mode or a tablet PC mode. In addition, the user interface setting change may include at least one of an icon arrangement state change, an icon size change, or a change of the number of icons.

The exposed area may be detected based on an exposed area of the flexible display 190, a length of the flexible display 190 in a moving direction, a pixel location of a resolution of one surface based on horizontal and vertical resolutions of the flexible display 190, or a location pre-defined through a sensor.

For example, the electronic device 100 may detect the extent to which the flexible display 190 is come in or come out of the housing, or an exposed area of the flexible display 190. According to an example embodiment, the electronic device 100 may include a sensor device 140 including at least one of a tension sensor, a hall sensor, an illuminance sensor, an image sensor, or a variable resistance sensor. According to an example embodiment, the tension sensor from among these sensors may detect the extent to which the flexible display 190 is come in or the exposed area by measuring a tension in an area where the flexible display 190 is come in or come out of the housing. According to various example embodiments, the extent to which the flexible display 190 is come in or the exposed area may be detected based on an electromagnetic signal or mechanical signal in the area where the flexible display 190 is come in or come out of the housing.

In operation 1103, a setting mode may be determined based on the exposed area or resolution. For example, the setting mode may include a setting value which may be stored in a memory and correspond to a display area or a display resolution. According to an example embodiment, when the exposed area of the display exceeds a first setting value, the electronic device 100 may enter a first mode. Such an operation may be controlled by the processor 112, and, when the exposed area of the display is less than the first setting value, the electronic device 100 may enter the first mode.

According to various example embodiments, the electronic device 100 may determine the setting mode by comparing the exposed area or resolution of the flexible display 190 with a pre-defined setting value. In addition, when the setting mode falls out of a range of the pre-defined setting value as a result of being compared with the pre-defined setting value, the electronic device 100 may control to output a display readjustment request.

When the electronic device 100 does not determine the setting mode, the readjustment request may be output in operation 1105. The readjustment request 900 may be output by using at least one of a vibration, an LED, a text, an image, or voice data like the pop-up window shown in FIG. 9.

In operation 1107, the electronic device 100 may perform at least one of a resolution setting change, an operation mode change, or a user interface setting change based on the setting mode. According to an example embodiment, the resolution setting change may refer to changing a resolution to a resolution corresponding to the exposed area of the flexible display 190. The operation mode change may refer to changing a software or hardware device mode such as a smartphone mode or a tablet PC mode. In addition, the user interface setting change may include at least one of an icon arrangement state change, an icon size change, or a change of the number of icons.

According to various example embodiments, when the electronic device 100 enters an Nth mode, the electronic device 100 may set a resolution or a user interface corresponding to the Nth mode. For example, the user interface may include at least one of an icon arrangement state, an icon size, or the number of icons, which are displayed on the flexible display 190. According to an example embodiment, the resolution of the display or the user interface may be selectively set.

Thereafter, the present procedure is finished.

An instruction set for each operation described above may be stored in the above-described memory as one or more modules. In this case, the module stored in the memory may be executed by one or more processors 112.

Prior to explaining example embodiments presented below, it should be noted that the example embodiments described below suggest many similar elements to those described above and thus a detailed explanation of some of the elements may be omitted.

Figure 12:
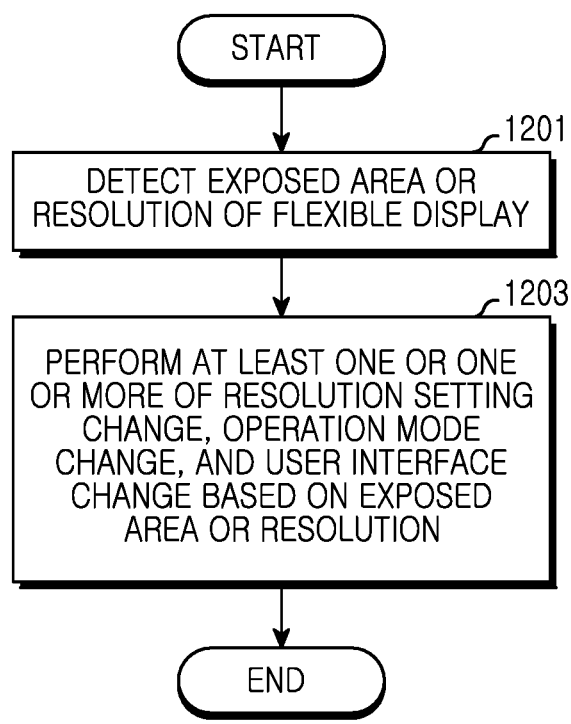
FIG. 12 is a sequence diagram of an example method for operating of an electronic device according to one of various example embodiments of the present disclosure.

FIG. 12 is a sequence diagram illustrating an example method for operating of an electronic device according to one of various example embodiments of the present disclosure.

In operation 1201, an exposed area or a resolution of the flexible display 190 is detected. According to an example embodiment, the exposed area may be detected based on an exposed area of the flexible display 190, a length of the flexible display 190 in a moving direction, a pixel location of a resolution of one surface based on horizontal and vertical resolutions of the flexible display 190, or a location pre-defined through a sensor.

For example, the electronic device 100 may detect the extent to which the flexible display 190 is come in the housing, or an exposed area of the flexible display 190. According to an example embodiment, the electronic device 100 may include a sensor device 140 including at least one of a tension sensor, a hall sensor, an illuminance sensor, an image sensor, or a variable resistance sensor. According to an example embodiment, the tension sensor from among these sensors may detect the extent to which the flexible display 190 is come in or the exposed area by measuring a tension in an area where the flexible display 190 is come in or come out of the housing. According to various example embodiments, the extent to which the flexible display 190 is come in or the exposed area may be detected based on an electromagnetic signal or mechanical signal in the area where the flexible display 190 is come in or come out of the housing.

In operation 1203, the electronic device 100 may perform at least one of a resolution setting change, an operation mode change, or a user interface setting change based on the exposed area or resolution. According to an example embodiment, the resolution setting change may refer to changing a resolution to a resolution corresponding to the exposed area of the flexible display 190. The operation mode change may refer to changing a software or hardware device mode such as a smartphone mode or a tablet PC mode. In addition, the user interface setting change may include at least one of an icon arrangement state change, an icon size change, or a change of the number of icons. Such an operation may be controlled by the processor 112.

Thereafter, the present procedure is finished.

Figure 13:
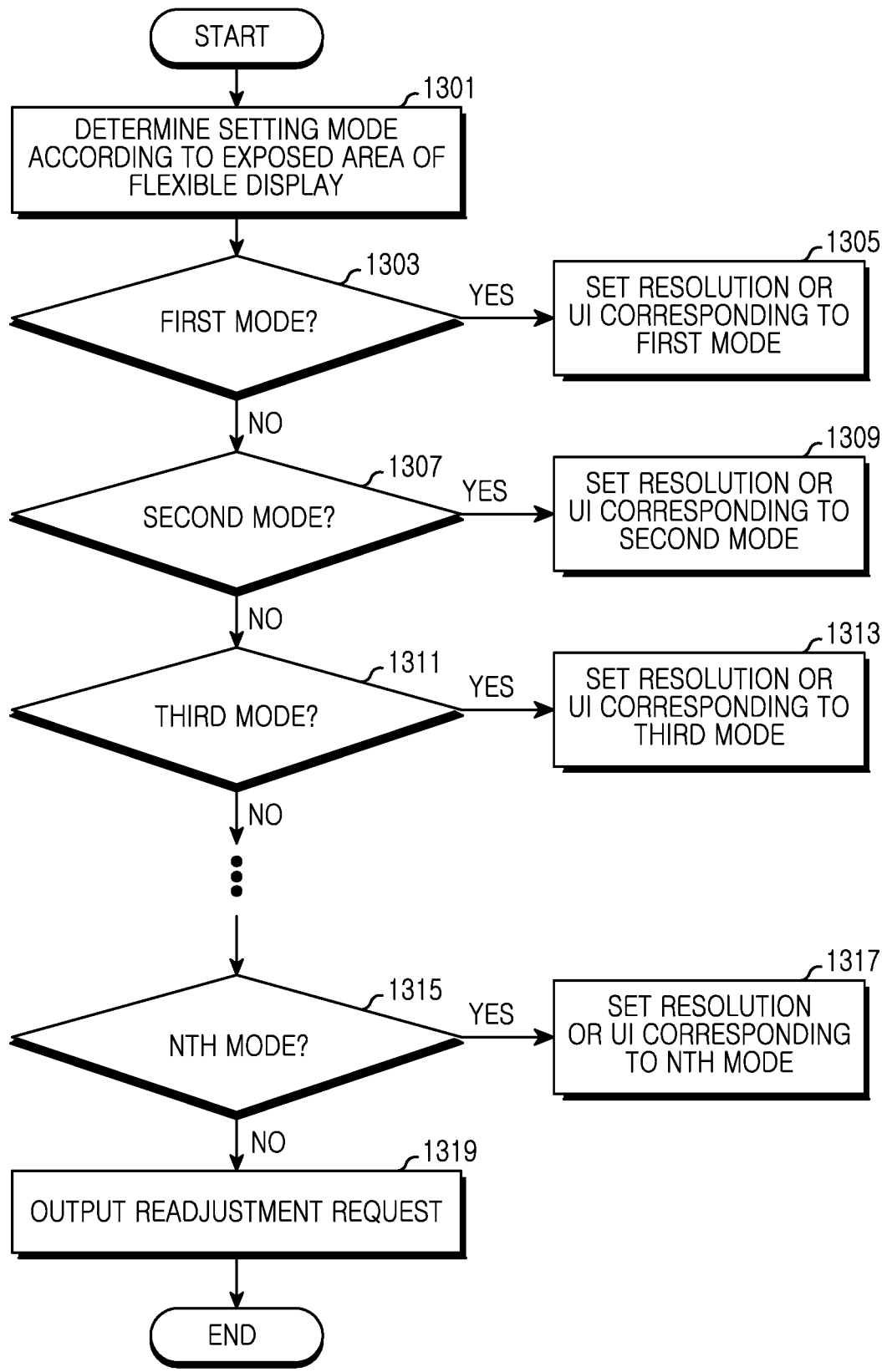
FIG. 13 is a sequence diagram of an example method for operating of an electronic device according to one of various example embodiments of the present disclosure.

FIG. 13 is a sequence diagram illustrating a method for operating of an electronic device according to one of various example embodiments of the present disclosure.

In operation 1301, the electronic device 100 may determine a setting mode according to an exposed area of the flexible display 190. According to an example embodiment, the exposed area may be detected based on an exposed area of the flexible display 190, a length of the flexible display 190 in a moving direction, a pixel location of a resolution of one surface based on horizontal and vertical resolutions of the flexible display 190, or a location pre-defined through a sensor.

For example, the electronic device 100 may detect the extent to which the flexible display 190 is come in the housing, or an exposed area of the flexible display 190. According to an example embodiment, the electronic device 100 may include a sensor device 140 including at least one of a tension sensor, a hall sensor, an illuminance sensor, an image sensor, or a variable resistance sensor. According to an example embodiment, the tension sensor from among these sensors may detect the extent to which the flexible display 190 is come in or the exposed area by measuring a tension in an area where the flexible display 190 is come in or come out of the housing. According to various example embodiments, the extent to which the flexible display 190 is come in or the exposed area may be detected based on an electromagnetic signal or mechanical signal in the area where the flexible display 190 is come in or come out of the housing.

According to an example embodiment, when the exposed area of the display exceeds a first setting value, the electronic device 100 may enter a first mode. Such an operation may be controlled by the processor 112, and, when the exposed area of the display is less than the first setting value, the electronic device 100 may enter the first mode.

According to various example embodiments, the electronic device 100 may determine the setting mode by comparing the exposed area or resolution of the flexible display 190 with a pre-defined setting value. In addition, when the setting mode falls out of a range of the pre-defined setting value as a result of being compared with the pre-defined setting value, the electronic device 100 may control to output a display readjustment request.

In operation 1303, the electronic device 100 may determine whether the electronic device 100 enters the first mode or not. According to an example embodiment, when the exposed area of the display exceeds the first setting value, the processor 112 may enter the first mode. According to various example embodiments, when the exposed area is less than the first setting value, the processor 112 may enter the first mode.

In operation 1305, a resolution or a user interface corresponding to the first mode may be set. According to various example embodiments, the above-described resolution or user interface may be stored in a memory, and for example, the user interface may include at least one of an icon arrangement state, an icon size, or the number of icons, which are displayed on the display.

When the electronic device 100 does not enter the first mode, the electronic device 100 may determine whether the electronic device 100 enters a second mode or not in operation 1307. According to various example embodiments, the processor 112 may enter the second mode when the exposed area of the display exceeds a second setting value.

In operation 1309, a resolution or a user interface corresponding to the second mode may be set. According to various example embodiments, the above-described resolution or user interface may be stored in a memory, and for example, the user interface may include at least one of an icon arrangement state, an icon size, or the number of icons, which are displayed on the display.

When the electronic device 100 does not enter the second mode, the electronic device 100 may determine whether the electronic device 100 enters a third mode or not in operation 1311. According to various example embodiments, the processor 112 may enter the third mode when the exposed area of the display exceeds a third setting value.

In operation 1313, a resolution or a user interface corresponding to the third mode may be set. According to an example embodiment, the above-described resolution or user interface may be stored in a memory, and for example, the user interface may include at least one of an icon arrangement state, an icon size, or the number of icons, which are displayed on the display.

In operation 1315, the electronic device 100 may determine whether the electronic device 100 enters an Nth mode. As described above, the processor 112 may set various setting modes and may set a resolution or user interface corresponding to each setting mode (operation 1317).

When the electronic device 100 does not determine the setting mode, the electronic device 100 may output a readjustment request in operation 1319. According to an example embodiment, the readjustment request (900 of FIG. 9) may be output by using at least one of a vibration, an LED, a text, an image or voice data like the pop-up window.

Thereafter, the present procedure is finished.

According to various example embodiments of the present disclosure, each module may be configured by software, firmware, hardware, or a combination thereof. In addition, some or all of the modules may be configured by a single entity and may perform functions of each module equally. According to various example embodiments of the present disclosure, each of the operations may be performed in sequence, repeatedly, or in parallel. In addition, some operations may be omitted or another operation may be added and performed. For example, each of the operations may be executed by a corresponding mode described in various example embodiments of the present disclosure.

Methods based on the embodiments disclosed in the claims or specification of the present disclosure can be implemented in hardware, software, or a combination of both. It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs including instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs including instructions that, when executed, implement embodiments of the present disclosure.

Accordingly, embodiments provide a program including code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

While the present disclosure has been particularly shown and described with reference to example embodiments thereof, it will be understood by those skilled in the art that various changes in form and details may be made therein without departing from the ambit of the present disclosure as defined by the appended claims.

What is claimed is:

1. An electronic device comprising:
a first housing;
a second housing facing the first housing;
a flexible display, wherein at least a portion of the flexible display can be inserted into or extracted from one of the first housing and the second housing;
a sensor configured to detect change of an exposed area of the flexible display;
a support device disposed between the first housing and the second housing, connecting the first housing and the second housing, and supporting the flexible display;
a memory storing instructions; and
at least one processor operatively coupled to the flexible display, the at least one processor configured to execute the instructions to:
display a screen in a first resolution through the flexible display;
while displaying the screen in the first resolution, detect the change of the exposed area of the flexible display by using the sensor;
determine a second resolution corresponding to the changed exposed area of the flexible display; and
based on the determination, display the screen in the second resolution through the flexible display,
wherein the support device further comprises:
a first link having a first side connected to the second housing, a second side opposite the first side configured to be fitted into the first housing, and a first recess, and
a second link having a third side connected to the first housing, a fourth side opposite the third side configured to be fitted into the second housing, and a second recess.

2. The electronic device of claim 1, wherein:
the first housing is coupled with an end of the flexible display; and
the second housing is coupled with another end of the flexible display,
wherein the exposed area of the flexible display is changed by inserting the at least the portion of the flexible display into the first housing or by extracting the at least the portion of the flexible display from the first housing.

3. The electronic device of claim 2, wherein the sensor comprises a hall sensor.

4. The electronic device of claim 1, wherein at least another portion of the flexible display is capable of being inserted into the second housing, and
wherein a first extent of a first area of the flexible display inserted into the first housing is different from a second extent of a second area of the flexible display inserted in the second housing.

5. The electronic device of claim 1, wherein arrangement of icons included in the screen that is displayed in the first resolution is different from arrangement of the icons included in the screen that is displayed in the second resolution.

6. The electronic device of claim 1, wherein the support device further comprises:
   a third link having a first connection member including a first rotary body operable along the first recess and a second connection member including a second rotary boy operable along the second recess.

7. The electronic device of claim 1, further comprising:
   at least one guide member attached to at least one edge area of the flexible display along a direction that the flexible display is inserted into the first housing,
   wherein the at least one guide member comprises at least one chain including a plurality of roller links coupled with one another in sequence and respectively secured by a plurality of roller pins.

8. A method executed in an electronic device with a first housing, a second housing facing the first housing, a flexible display, a sensor configured to detect change of an exposed area of the flexible display, and a support device disposed between the first housing and the second housing connecting the first housing and the second housing and supporting the flexible display, wherein at least a portion of the flexible display can be inserted into or extracted from one of the first housing and the second housing, the method comprising:
   displaying a screen in a first resolution through the flexible display;
   while displaying the screen in the first resolution, detecting the change of the exposed area of the flexible display by using the sensor;
   determining a second resolution corresponding to the changed exposed area of the flexible display; and
   based on the determination, displaying the screen in the second resolution through the flexible display,
   wherein the support device further comprises:
      a first link having a first side connected to the second housing, a second side opposite the first side configured to be fitted into the first housing, and a first recess, and
      a second link having a third side connected to the first housing, a fourth side opposite the third side configured to be fitted into the second housing, and a second recess.

9. The method of claim 8, wherein arrangement of icons included in the screen that is displayed in the first resolution is different from arrangement of the icons included in the screen that is displayed in the second resolution.

* * * * *